United States Patent
Powell, Jr.

[11] Patent Number: 6,131,474
[45] Date of Patent: Oct. 17, 2000

[54] WINDSHIELD WIPER DRIVE TRAIN

[75] Inventor: Edward S. Powell, Jr., Portland, Oreg.

[73] Assignee: Albany Magento Equipment, Inc., Jefferson, Oreg.

[21] Appl. No.: 08/965,372

[22] Filed: Nov. 6, 1997

[51] Int. Cl.⁷ .................................. B60S 1/18; B60S 1/22
[52] U.S. Cl. ............................. 74/42; 74/570; 74/571 L; 15/250.3; 15/250.13
[58] Field of Search .......................... 74/42, 43, 579 R, 74/570, 579 F, 596, 595, 571 M, 571 R, 571 L; 15/250.3, 250.14, 250.13, 250.27

[56] References Cited

U.S. PATENT DOCUMENTS

| | | | |
|---|---|---|---|
| 936,213 | 10/1909 | Bordenkircher | 74/570 |
| 1,212,440 | 1/1917 | Becker | 74/570 |
| 2,768,530 | 10/1956 | Brundage | 74/75 |
| 2,770,203 | 11/1956 | Ooms | 74/40 |
| 3,717,048 | 2/1973 | Carpenter . | |
| 3,748,914 | 7/1973 | Parsons | 74/42 |
| 3,763,518 | 10/1973 | Bellware . | |
| 4,732,048 | 3/1988 | Sakakibara et al. . | |
| 5,012,525 | 5/1991 | Kühbauch . | |
| 5,090,081 | 2/1992 | Yamamoto et al. | 74/571 L |
| 5,201,094 | 4/1993 | Yamamoto et al. . | |
| 5,287,585 | 2/1994 | Yamamoto et al. . | |
| 5,333,351 | 8/1994 | Sato | 15/250.13 |
| 5,388,482 | 2/1995 | Jones et al. . | |
| 5,465,636 | 11/1995 | Jones et al. . | |
| 5,511,271 | 4/1996 | Shishido et al. | 15/49.1 |
| 5,566,577 | 10/1996 | Klar | 74/42 |
| 5,577,843 | 11/1996 | Leininger | 384/275 |

FOREIGN PATENT DOCUMENTS

| | | | |
|---|---|---|---|
| 163254 | 10/1948 | Austria | 74/571 L |
| 01141148 | 6/1989 | Japan . | |
| 03217359 | 9/1991 | Japan . | |

*Primary Examiner*—David A. Bucci
*Assistant Examiner*—William C. Joyce
*Attorney, Agent, or Firm*—Chernoff, Vilhauer, McClung & Stenzel, LLP

[57] ABSTRACT

A windshield wiper drive train adapted for long life. The drive train includes motor assembly that supports and drives a drive shaft. A circular drive plate is attached eccentrically to the drive shaft to rotate through an eccentric orbit about the drive shaft as the drive shaft rotates. A connecting member having a body portion defining a round opening that is slidingly fitted about said circular drive plate and an arm portion extending outwardly from the body portion undergoes reciprocating motion in response to rotation of said circular drive plate. A rocker assembly having a rockshaft and a rocker arm attached to the rockshaft is connected by pivot joint to the arm portion of the connecting member. In operation, the rocker assembly is rocked by the reciprocating motion of the arm portion when the drive shaft rotates. The rockshaft is adapted to engage a further attachment such as a windshield wiper.

10 Claims, 4 Drawing Sheets

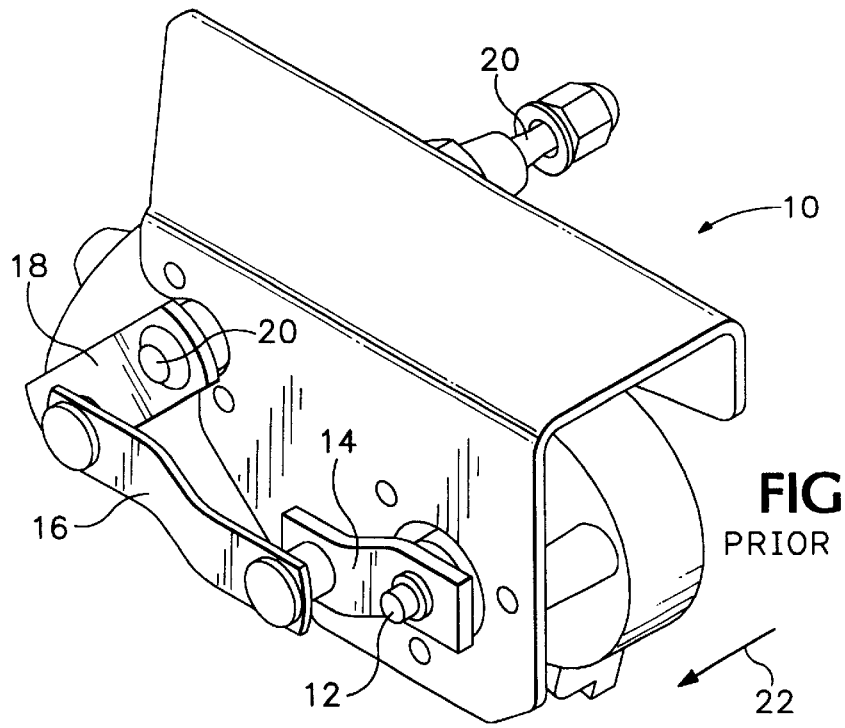
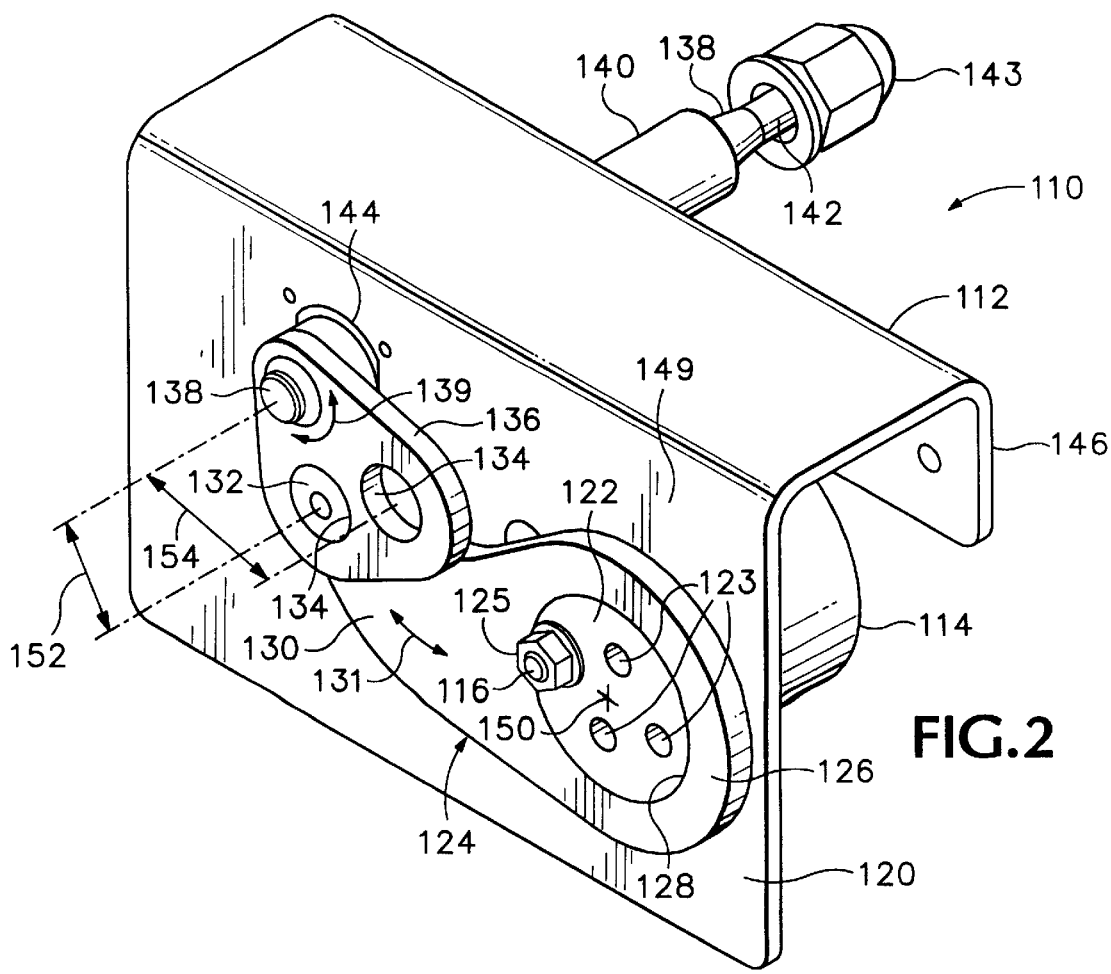

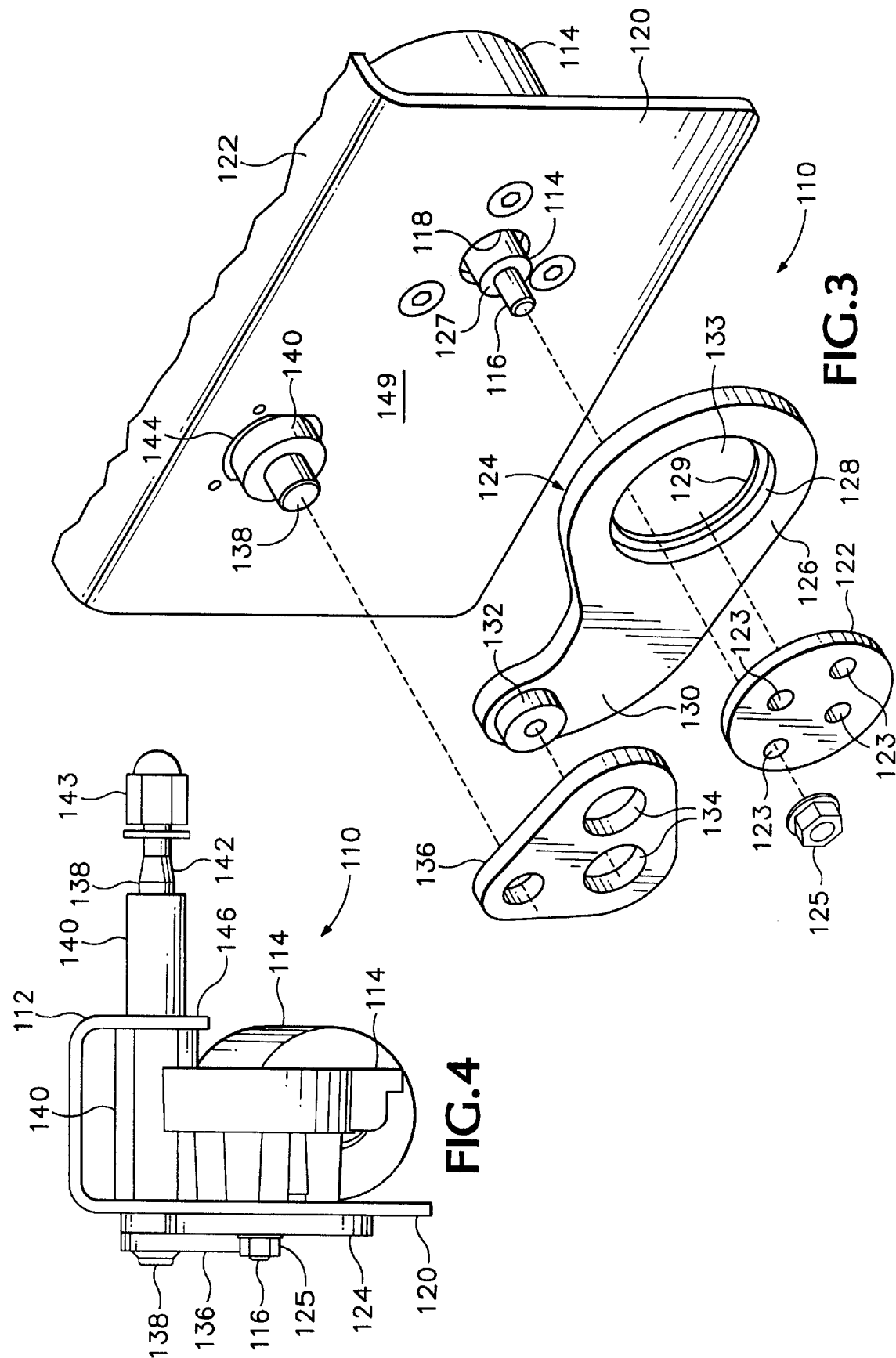

WINDSHIELD WIPER DRIVE TRAIN

BACKGROUND OF THE INVENTION

The present invention relates to windshield wiper drive trains.

Referring to FIG. 1 a prior art windshield wiper drive train 10 includes a drive shaft 12, a rotating crank arm 14 rigidly attached to drive shaft 12 and a drive bar 16, pivotally joined to crank arm 14. The drive bar 16, in turn, is pivotally joined to and drives a rocker arm 18, which drives a rockshaft 20, to which a windshield wiper may be attached. A problem with this arrangement is caused by the forward (see forward direction arrow 22) offset between drive bar 16 and the point of attachment of rotating arm 14 onto drive shaft 12. This offset is needed for the drive bar 16 to clear the end of the shaft 12, but causes a torque against drive shaft 12 as if to rotate drive shaft 12 in a direction perpendicular to its axis of rotation. This tends to wear out the bearings (not shown) supporting drive shaft 12. Moreover, the pivot joint between rotating arm 14 and drive bar 16, and the pivot joint between drive bar 16 and rockshaft 18 are both wear points that eventually degrade under long term drive train operation.

Furthermore, this type of drive train is not as flexible as is ideally desirable, not being very well adapted to the attachment of additional elements for driving further windshield wipers. Moreover, this type of drive train is not easily adaptable to gearing for different windshield wiper sweep angles.

What is needed then, is a windshield wiper drive train which reduces the wear on the drive shaft bearings by reducing the torque against the drive shaft that is perpendicular to the drive shaft axis of rotation. Also needed is a windshield wiper drive train that is easily gearable to various windshield wiper sweep angles.

SUMMARY OF THE INVENTION

The present invention meets the above-noted need by providing a windshield wiper drive train adapted for long life. The drive train includes a motor assembly that supports and drives a drive shaft. A circular drive plate is attached to the drive shaft and is rotated through an eccentric orbit by said drive shaft as the drive shaft rotates. A connecting member has a body portion defining a round opening that is slidingly fitted about said circular drive plate and an arm portion extending outwardly from the body portion that undergoes reciprocating motion in response to the circular drive plate rotation. A rocker assembly has a rockshaft that is rotatably mounted to said frame and a rocker arm attached to said rockshaft and pivot joint to the arm portion of the connecting member. In operation, the rocker assembly is rocked by the reciprocating motion of the arm portion when the drive shaft rotates. The rockshaft is adapted to engage a further attachment such as a windshield wiper.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is an isometric view of a prior art windshield wiper drive train.

FIG. 2 is an isometric view of a windshield wiper drive train according to the present invention.

FIG. 3 is an exploded isometric view of the windshield wiper drive train of FIG. 2.

FIG. 4 is a side view of the windshield wiper drive train of FIG. 2.

DETAILED DESCRIPTION OF THE PREFERRED EMBODIMENT

Figure 5:
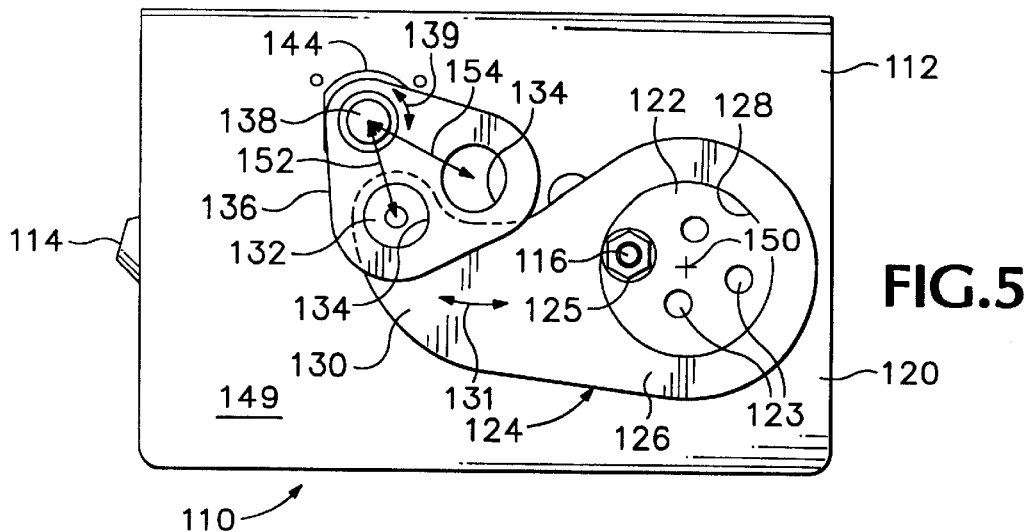
FIG. 5 is a front view of the windshield wiper drive train of FIG. 2.
Figure 6:
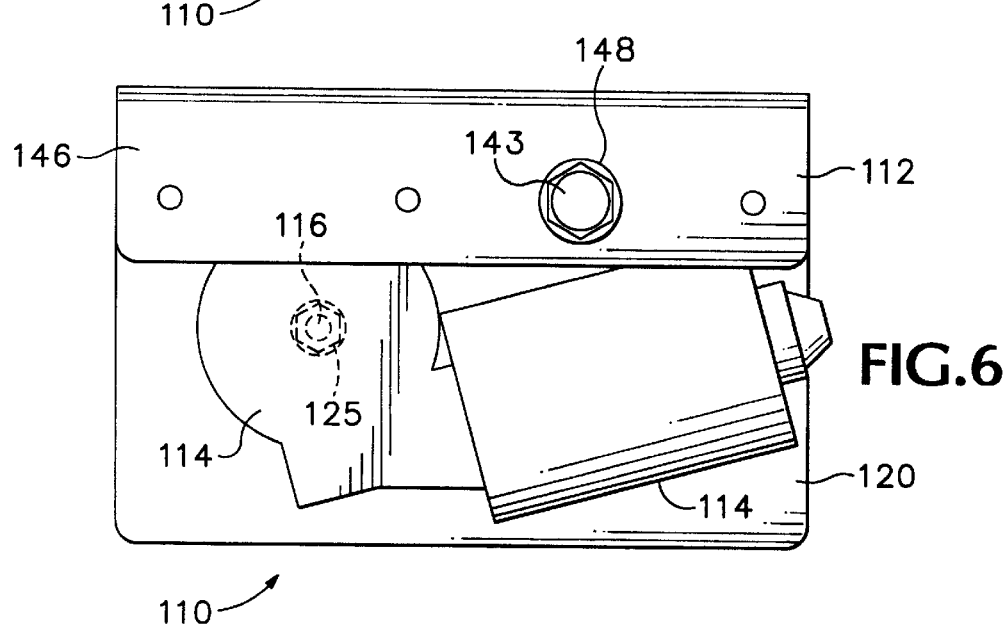
FIG. 6 is a rear view of the windshield wiper drive train of FIG. 2.

Referring to FIG. 2, a windshield wiper drive train 110 comprises a U-shaped frame 112 to which is bolted a motor/gear assembly 114, which rotates a drive shaft 116. A drive shaft aperture 118 permits drive shaft 116 to pass through a front wall 120 of frame 112. A circular drive plate 122 is attached to drive shaft 116 at one of four circular drive plate attachment apertures 123, by a circular drive plate attachment nut 125 fastened onto the shaft to clamp the drive plate 122 against a shoulder 127 on the drive shaft 116. Fitted about circular drive plate 122 is a connecting member 124, having a body portion 126 defining a round indentation 128 that is rotatably engaged about circular drive plate 122 so that the drive plate can rotate with the indentation 128. Indentation lip 129 permits the retention of member 124 by plate 122. Indentation aperture 133 permits the shaft 116 to extend through member 124. Connecting member 124 also includes an arm portion 130 extending radially outwardly away from said drive plate 122. Arm portion 130 moves cyclically as indicated by the double-headed arrow 131 in response to the eccentric rotation of circular drive plate 122 in the indentation 128.

Arm portion 130 includes a pivot joint stub shaft or knob 132 which fits through one of a pair of pivot joint apertures 134 in a triangular rocker arm 136 to pivotally connect the arm portion 130 to rocker arm 136. Arm portion 130 drives rocker arm 136 in a reciprocating rotary motion which is imparted to a rockshaft 138 as indicated by arrow 139. Rockshaft 138 is rotatably mounted in suitable bearings located in a rockshaft support sleeve 140. A rockshaft free end 142 is adapted to permit the easy attachment of a windshield wiper, to be fastened in place with an attachment nut 143. Support sleeve 140 is supported by front wall 120 through which sleeve 140 passes at a front wall support aperture 144 and by a rear wall 146 of frame 112 through which sleeve 140 passes at a rear wall support aperture 148. Sleeve 140 locks into front wall 120 so that sleeve 140 can not rotate in response to the rotation of rockshaft 138. Rockshaft 138 is constrained from forward and rearward movement by the bearings (not shown) located in sleeve 140.

The rearward movement of member 124 is constrained by sliding contact between the rear major surface (not shown) of member 124 and an outer major surface 149 of front wall 120. The forward movement of member 124 is constrained by plate 122 and rocker arm 136. This contact keeps member 124 and circular drive plate 122 in good alignment, so that harmful torques do not develop between them.

The four attachment apertures 123 of circular drive plate 122 are located at four different radial distances from the center 150 of the drive plate 122 and thus define four distinct and selectable circular drive plate eccentric orbits around shaft 116. In addition rocker arm 136 has two different pivot joint apertures 34, preferably at different radial distances 152, 154 from the center of the rockshaft 138. The pivot joint apertures 134 and attachment apertures 123 together yield eight different windshield wiper sweep actions.

Figure 7A:
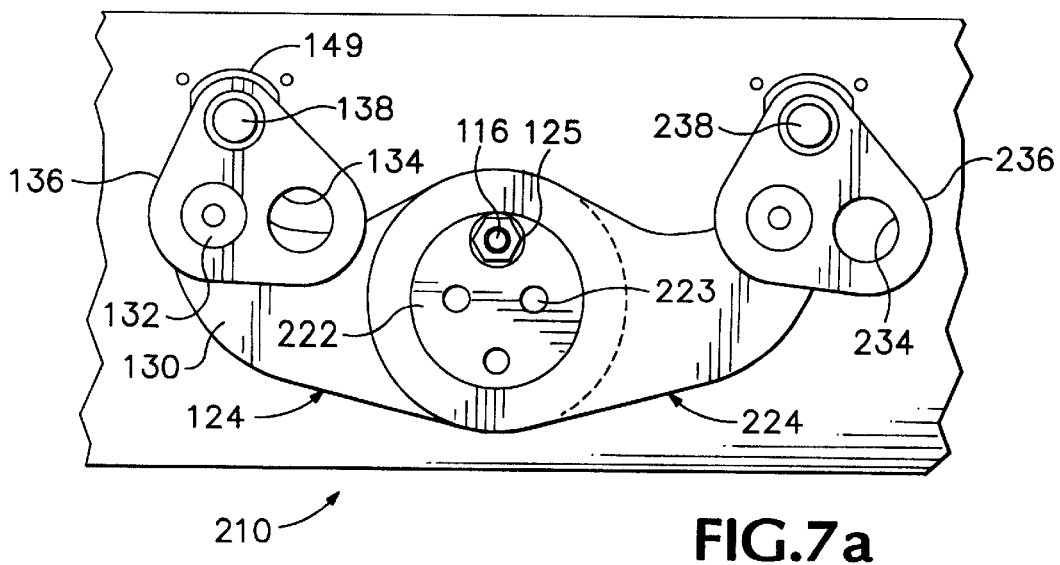
FIG. 7a is a front view of a windshield wiper drive train that is an alternative embodiment of the present invention.
Figure 7B:
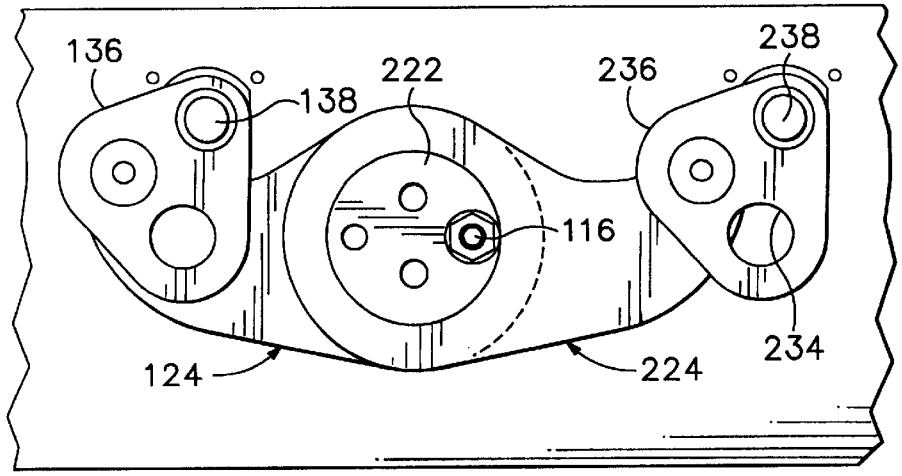
FIG. 7b is a front view of the windshield wiper drive train of FIG. 7a but with the moving parts moved to a different position.
Figure 8A:
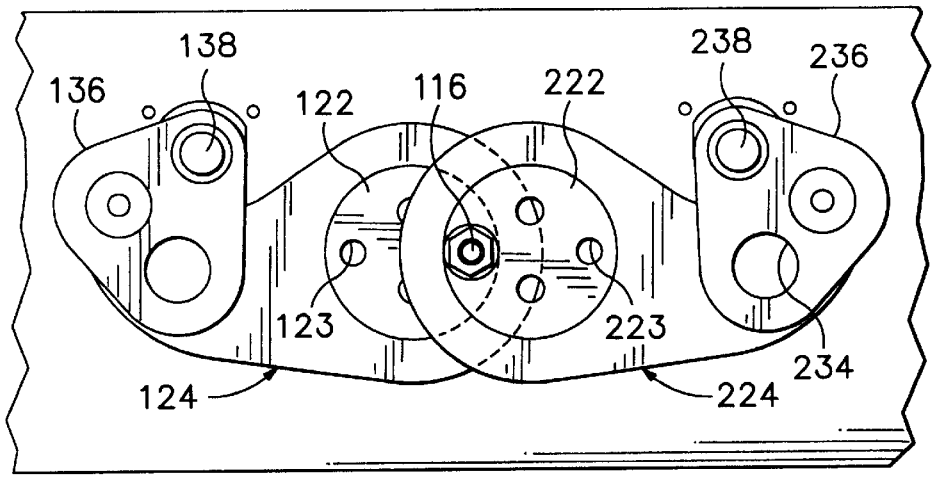
FIG. 8a is a front view of a windshield wiper drive train that is an additional alternative embodiment of the present invention.
Figure 8B:
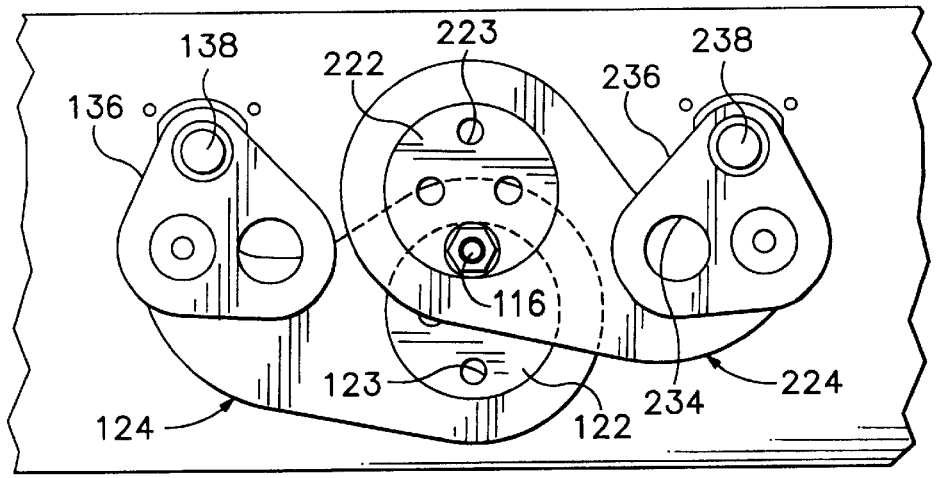
FIG. 8b is a front view of the windshield wiper drive train of FIG. 8a but with the moving parts moved to a different position.

Referring to FIGS. 7a–8b (in which additional elements analogous to those of FIGS. 2–6 are identified by the reference numbers of FIGS. 2–6 incremented by 100) an alternative windshield wiper drive train 210 for driving two windshield wipers may be constructed by fastening a second circular drive plate 222 in front of circular drive plate 122 and using circular drive plate 222 to drive a second connecting member 224 and a second rocker arm 236 and a rockshaft 238. FIGS. 7a–7b show such a mechanism arranged to drive the windshield wipers in tandem. FIGS. 8a–8b show a similar mechanism with the two drive plates 122 and 222 fitted on the shaft 116 to have eccentric orbits that are 180° out of phase with each other so that the windshield wipers are driven as mirror images to each other, with both wipers sweeping out and then in simultaneously. This is a popular arrangement in boats and buses. Moreover, the sweep angles of each windshield wiper may be set individually by use of attachment apertures 123 and 223 and pivot joint apertures 134 and 234.

One advantage of drive trains 110 and 210 is that, compared with prior art windshield wiper drive train 10, the torque on shaft 116 that is perpendicular to its axis of rotation is greatly reduced, permitting considerably longer bearing wear.

In one embodiment of the apparatus described, frame 112, drive shaft 116, circular drive plate 122 and rocker arm 136 are made of 1018 steel. Rockshaft 138 is made of aluminum. Connecting member 124 is preferably made of a self-lubricating material such as a mixture of 98% homo polymer acetal and 2% fluorinated polymer, which may be obtained from E.I. DuPont De Nemours & Co. of Wilmington, Del. under the trade name Delren® with 2% Teflon®. The use of a self-lubricating material for member 124 is important to the rotatable engagement of member 124 about circular drive plate 122 without use of anti-friction bearings. A suitable motor gear assembly 114 is available from UT Motor Systems, Inc., Dearborn, Mich., under the designator United Technologies WJ.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A windshield wiper drive train, comprising:
   (a) a frame;
   (b) a motor assembly, mounted on said frame;
   (c) a drive shaft, supported and driven in full rotation by said motor assembly;
   (d) a circular drive plate attached eccentrically to said drive shaft for rotation therewith;
   (e) a connecting member having a body portion defining a round opening rotatably fitted about said circular drive plate and an arm portion extending radially away from said circular drive plate; and
   (f) a rocker assembly having a rockshaft mounted rotatably with respect to said frame and a rocker arm attached to said rockshaft and connected by a pivot joint to said arm portion, said rocker assembly being rocked reciprocatingly by motion of said arm portion when said drive shaft rotates.

2. The drive train of claim 1 wherein said circular drive plate has a center and includes a plurality of drive shaft attachment points located at different respective distances from said center, each attachment point yielding an eccentric orbit that, in turn, yields a range of said reciprocating motion.

3. The drive train of claim 2 wherein said drive shaft attachment points comprise a plurality of circular apertures, each aperture adapted to be fitted about said drive shaft.

4. The drive train of claim 1, further comprising:
   (a) a second circular drive plate attached eccentrically to said drive shaft for rotation therewith;
   (b) a second connecting member having a body portion defining a round opening slidingly fitted about said second circular drive plate and an arm portion extending radially outwardly away from said second circular drive plate; and
   (c) a second rocker assembly having a rockshaft mounted rotatably with respect to said frame and a rocker arm attached to said rockshaft and connected by a pivot joint to said arm portion of said second connecting member, said second rocker assembly being rocked reciprocatingly by motion of said arm portion of said second connecting member when said drive shaft rotates.

5. The drive train of claim 4 wherein said circular drive plate and said second circular drive plate are attached to said drive shaft so as to have eccentric orbits that are 180° out of phase, causing said rock shafts to rock in mirror image to each other.

6. The drive train of claim 1 wherein said connecting member is made of a self-lubricating material.

7. The drive train of claim 1 wherein said rockshaft is adapted to engage a further attachment including a windshield wiper.

8. The drive train of claim 1 wherein said connecting member is substantially planar, said rocker arm is substantially planar, and said rocker arm is mounted forward of said connecting member to retain said connecting member.

9. The drive train of claim 1 wherein said connecting member includes an indentation lip to permit retention of said connecting member by said circular drive plate.

10. A windshield wiper drive train, comprising:
    (a) a frame;
    (b) a motor assembly, mounted on said frame;
    (c) a drive shaft, supported and driven by said motor assembly;
    (d) a circular drive plate attached eccentrically to said drive shaft for rotation therewith;
    (e) a connecting member having a body portion defining a round opening rotatably fitted about said circular drive plate and an arm portion extending radially away from said circular drive plate;
    (f) a rocker assembly having a rockshaft mounted rotatable with respect to said frame and a rocker arm attached to said rockshaft and connected by pivot joint to said arm portion, said rocker assembly being rocked reciprocatingly by motion of said arm portion when said drive shaft rotates; and (g) wherein said frame includes a first wall having a major surface and said connecting member has a major surface and wherein said connecting member major surface is in sliding contact over said wall major surface.

* * * * *

UNITED STATES PATENT AND TRADEMARK OFFICE
CERTIFICATE OF CORRECTION

PATENT NO. : 6,131,474
DATED : October 17, 2000
INVENTOR(S) : Edward S. Powell, Jr.

It is certified that error appears in the above-identified patent and that said Letters Patent is hereby corrected as shown below:

Column 3,
Line 8, change "joint apertures 34" to -- joint apertures 134 --

Signed and Sealed this

Twenty-fourth Day of September, 2002

Attest:

Attesting Officer

JAMES E. ROGAN
*Director of the United States Patent and Trademark Office*